United States Patent
Finger et al.

(10) Patent No.: US 6,571,558 B2
(45) Date of Patent: Jun. 3, 2003

(54) EXHAUST GAS TURBOCHARGER FOR AN INTERNAL COMBUSTION ENGINE

(75) Inventors: Helmut Finger, Leinfelden-Echterdingen; Peter Fledersbacher, Stuttgart; Paul Löffler, Stuttgart; Siegfried Sumser, Stuttgart; Friedrich Wirbeleit, Esslingen, all of (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/932,273

(22) Filed: Aug. 17, 2001

(65) Prior Publication Data

US 2002/0040581 A1 Apr. 11, 2002

(30) Foreign Application Priority Data

Aug. 17, 2000 (DE) .......................................... 100 40 122

(51) Int. Cl.$^7$ ............................................... F02B 33/44
(52) U.S. Cl. ..................... 60/605.1; 60/607; 417/407
(58) Field of Search ................................. 60/605.1, 607; 417/371, 423.14, 407

(56) References Cited

U.S. PATENT DOCUMENTS

| 5,074,115 | A |   | 12/1991 | Kawamura |
| 5,605,045 | A |   | 2/1997 | Woollenweber |
| 5,904,471 | A | * | 5/1999 | Woollenweber et al. .... 417/371 |
| 6,145,314 | A | * | 11/2000 | Woollenweber et al. ...... 60/607 |

FOREIGN PATENT DOCUMENTS

| DE | 28 08 147 | 8/1979 |
| EP | 0 420 666 a1 | 4/1991 |

* cited by examiner

*Primary Examiner*—Hoang Nguyen
(74) *Attorney, Agent, or Firm*—Klaus J. Bach

(57) ABSTRACT

In an exhaust gas turbocharger for an internal combustion engine having an exhaust gas turbine arranged in an exhaust gas line, and a compressor arranged in an in-take duct and connected to the turbine by way of a shaft, the compressor includes a compressor wheel forming at the same time a rotor of an electric motor.

14 Claims, 2 Drawing Sheets

EXHAUST GAS TURBOCHARGER FOR AN INTERNAL COMBUSTION ENGINE

BACKGROUND OF THE INVENTION

The invention relates to an exhaust gas turbocharger for an internal combustion engine including an exhaust gas turbine, a compressor and an electric motor.

Publication DE-OS 28 08 147 describes such an exhaust gas turbocharger which comprises an exhaust gas turbine acted on by the engine exhaust gases, and a compressor wheel in the intake section of the internal combustion engine, which wheel is driven by the exhaust gas turbine and via which combustion air taken in is compressed to an elevated boost pressure. Integrated into the exhaust gas turbocharger is an electric motor, the armature of which is located on a shaft between the turbine wheel and the compressor wheel and the stator of which is located in a stationary manner in the housing of the charger and surrounds the armature radially. By actuating the electric motor, energy is additionally supplied to the exhaust gas turbocharger, so that, in particular in operating states of the internal combustion engine in which the exhaust gas back pressure is not sufficient to generate a sufficiently high boost pressure, the compressor can be driven additionally so that a desired boost pressure level can be obtained.

The electric motor can also be used as a generator, when the energy obtained from the exhaust gas turbine is greater than the energy required in the compressor for generating the necessary boost pressure. Use as a motor and as a generator improves the overall engine efficiency.

The armature of the electric motor extends axially over the length of the shaft between the turbine and the compressor, so that the mass moment of inertia of the rotating parts of the exhaust gas turbocharger is distinctly greater in comparison with a version without an electric motor. The increase in the mass moment of inertia in turn reduces the efficiency of the charger.

Comparable exhaust gas turbochargers, which are combined with electric motors, are also described in publications EP 0 420 666 A1, U.S. Pat. No. 5,605,045 and U.S. Pat. No. 5,074,115.

A further version of an exhaust gas turbocharger driven by an electric motor is disclosed in US 5 870 894. According to this publication, the compressor wheel includes on its rear side facing the turbine, a radial recess, in which a magnet is disposed, which is connected in a rotationally fixed manner to the compressor wheel and interacts with coils which are fixed to the housing so that current can be supplied to the coils. In this way, a relatively compact construction is achieved, but the magnets on the rear side of the compressor wheel limit the design possibilities for the compressor wheel. Furthermore, also the mass moment of inertia of the compressor wheel is relatively large in this version, in order to achieve a significant increase in performance by switching energizing the electric motor.

The problem to be solved by the invention is that of producing an exhaust gas turbocharger for an internal combustion engine with an additional electric-motor drive, which provides for high efficiency and extensive design possibilities.

SUMMARY OF THE INVENTION

In an exhaust gas turbocharger for an internal combustion engine having an exhaust gas turbine arranged in an exhaust gas line, and a compressor arranged in an in-take duct and connected to the turbine by way of a shaft, the compressor includes a compressor wheel forming at the same time a rotor of an electric motor.

The rotor of the electric motor is an integral part of the compressor wheel, the rotor being contoured favorably for flow and thus also taking over the functions of the compressor wheel. As the rotor now no longer constitutes an additional component, but is integrally formed with the compressor wheel or is a part of the compressor wheel, the maximum possible degree of compactness is achieved.

The shape of the rotor is defined fundamentally by its function as compressor wheel. Both the. axial length and the radial extent of the compressor wheel can be adapted to flow-related requirements virtually without any limiting conditions, as can the shape and the design of the compressor wheel. At the same time, the dimensions of the compressor wheel can in principle be retained on account of the integration of the rotor into the wheel, so that the mass moment of inertia of the compressor wheel does not increase or does not increase significantly either.

A further advantage is that the electric-motor drive is separated from the lubricating oil of the exhaust gas turbocharger. The rotor is disposed on the air side of the compressor wheel, which does not come into contact with the lubrication system in order to keep the combustion air clean.

In a first embodiment, the entire compressor wheel consists of an electrically conductive material, so that the entire compressor wheel can be regarded as the rotor. This embodiment is characterized by a homogeneous material structure of the compressor wheel.

In a second embodiment, while the compressor wheel and the rotor consist of different materials but form a single component. In the arrangement the compressor wheel may consist of an electrically non-conductive material of lower density than the rotor, in order to reduce the mass moment of inertia. Also in this embodiment, the rotor is contoured favorably for flow and is to be regarded as a part of the compressor wheel as far as flow is concerned. This embodiment affords the advantage that conventional exhaust gas turbochargers can be retrofitted with a rotor contoured favorably for flow, in order to produce an additional electric-motor drive, and moreover, the flow behavior of the compressor wheel can also be positively influenced.

In a preferred embodiment, the compressor wheel is divided functionally into an auxiliary wheel and a main wheel, the auxiliary wheel forming the rotor, and the main wheel being arranged downstream of the auxiliary wheel in the direction of flow. With this functionally two-piece embodiment of the compressor wheel, additional design possibilities are obtained, via which the compressor behavior can be positively influenced. The auxiliary wheel and the main wheel can, for example, be provided with different free flow cross sectional areas, whereby the compressor characteristics can be influenced in a desired manner via the relationship between the flow cross sections of the auxiliary wheel and the main wheel. For example, the surge limit of the compressor can be changed positively by selecting the flow cross section in the auxiliary wheel so as to be smaller than the flow cross section in the main wheel. The throughput behavior of the compressor wheel as a whole can thus be influenced. On the other hand, if the relationship between the flow cross sections is reversed,—that is the flow cross section in the auxiliary wheel is greater than the flow cross section in the main wheel—the air flow can be accelerated in relation to the main wheel.

A further advantageous design possibility with regard to the aerodynamics of the compressor wheel as a whole lies in the selection of the number of blades in the auxiliary wheel and in the main wheel. It is possible, for example, to provide only half as many blades in the auxiliary wheel as in the main wheel, as a result of which in particular the weight and the mass moment of inertia of the auxiliary wheel can be reduced. In addition, the auxiliary wheel in this embodiment offers lower flow resistance.

The invention will become more readily apparent from the following description of different embodiments thereof described below on the basis of the accompanying drawings.

BRIEF DESCRIPTION OF THE DRAWINGS

In the following figures, the same components are provided with the same reference numbers.

DESCRIPTION OF PREFERRED EMBODIMENTS

Figure 1:
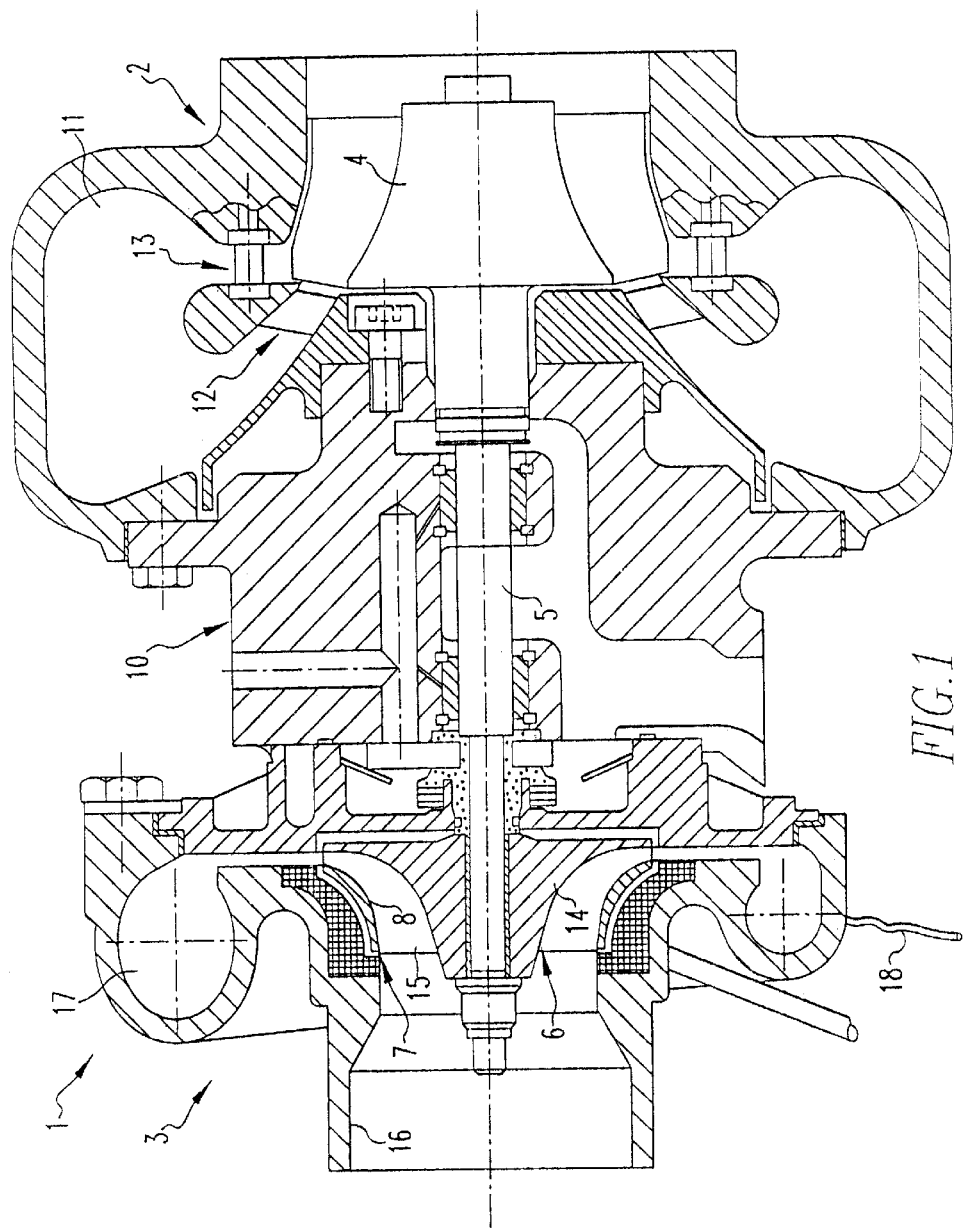
FIG. 1 shows a section through an exhaust gas turbocharger for an internal combustion engine, the compressor wheel of the compressor at the same time forming a rotor of an electric motor.

The exhaust gas turbocharger 1 illustrated in FIG. 1 comprises an exhaust gas turbine 2 and a compressor 3 in a common housing 10. The exhaust gas turbine 2 is designed as a semi-axial/radial turbine, to which exhaust gas from the exhaust gas line of the internal combustion engine can be supplied via an inflow duct 11, the inflow duct 11 having a semi-axial inlet flow passage 12 and also a radial inlet flow passage 13 to the turbine wheel 4 of the exhaust gas turbine 2. In the region of the radial inlet flow passage 13, a variable turbine geometry is provided, via which the free flow cross section can be adjusted variably between a blocking position and an open position.

The turbine wheel 4 is connected to a compressor wheel 6 of the compressor 3 via a shaft 5. The compressor wheel 6 consists of a wheel hub 14 and compressor wheel blades 15 connected in one piece to the wheel hub 14. Via the compressor wheel 6, fresh air flowing into a compressor inflow duct 16 is compressed to a boost pressure and directed into a compressor outlet region 17.

In addition to the mechanical drive via the shaft 5, the compressor wheel 6 can be driven electrically via an electric motor 7. The electric motor 7 comprises a rotor 8 forming part of the compressor wheel 6, and a stator 9 which is mounted in the housing of the compressor 3 and surrounds the rotor 8. The rotor 8 of the electric motor 7 is annular and is located adjacent the radially outer edges of the compressor wheel blades 15. The rotor 8 consists of a magnetic material. When current is applied to the stator 9, an electromagnetic force which rotates the rotor 8 is generated. Current is applied to the stator 9 via an external power source. The level of current applied can be adjusted depending on relevant engine operating variables. For a controlled operation of the electric motor 7, the speed of the compressor wheel 6 can be measured via a sensor 18.

The electric motor 7 can be energized for engine operating modes in which a higher boost pressure of the combustion air is desired than can be achieved via the mechanical drive by the exhaust gas turbine 2. The electric motor could be used for example at low engine speeds, at which only a comparatively low exhaust gas backpressure is available to drive the exhaust gas turbine 2, or in temporary transitional ranges, for example during acceleration.

Further, the electric motor 7 can be used not only to drive the compressor wheel 6 but also as a generator. In motor operating modes in which a greater turbine out-put and thus potentially a greater compressor output is available from the prevailing exhaust gas back-pressure than is required for the compression of the fresh air, the speed of the charger can be limited by generator operation of the electric motor 7. Current can thus be generated, which can be supplied to a current storage facility. Control of operating mode or generator mode of the electric motor 7 takes place via an automatic control arrangement depending on engine operating parameters and motor state variables.

The rotor 8 of the electric motor 7 is advantageously designed as a magnetic cover ring which is located on the radially outer edges of the compressor wheel blades 15 and is connected in a rotationally fixed manner to the compressor wheel 6. In this embodiment, while the rotor 8 is made integrally with the compressor wheel 6, the blading of the compressor wheel 6 and the rotor 8 can nevertheless consist of different materials, the wheel hub 14 and the compressor wheel blades 15 expediently consisting of a material of lower density, for example an aluminum alloy, in order to reduce the mass moment of inertia.

The electric motor 7 is arranged on the air side of the exhaust gas turbocharger 1. The rotor 8 of the electric motor 7 is contoured, so that the flow conditions in the compressor 3 are positively influenced and the compressor behavior is improved.

Formed between the rotor 8 and the stator 9 there is an air gap which can be used to generate a recirculation flow in order to influence positively the surge limit of the compressor. The swirl of the recirculation flow can be influenced via the surface design of the rotor 8 in the form of a cover ring.

Figure 2:
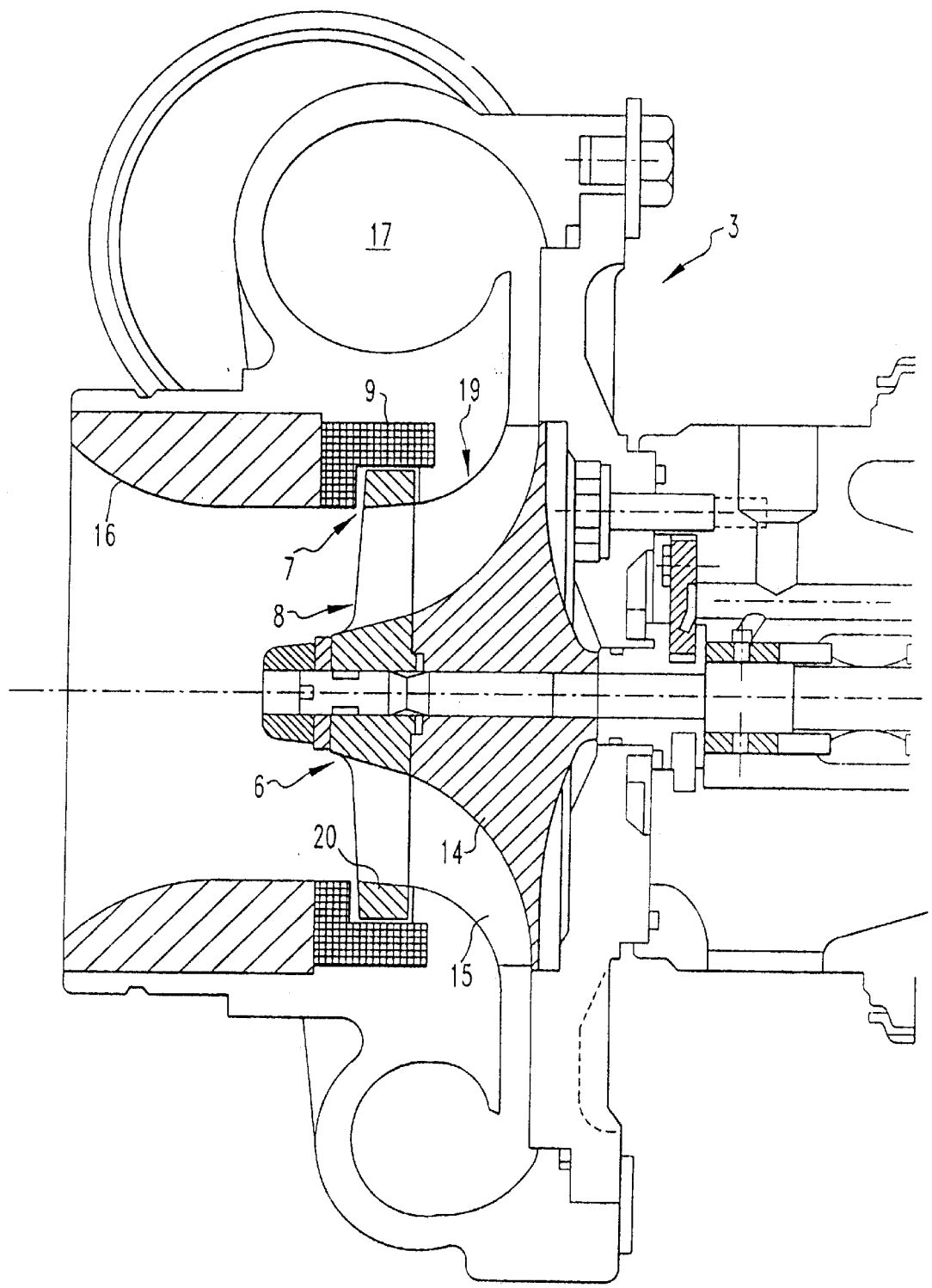
FIG. 2 shows a section through another embodiment of a compressor.

In the illustrative embodiment according to FIG. 2, the compressor wheel 6 is divided axially into two regions, namely into an auxiliary wheel formed by the rotor 8 of the electric motor 7, and a main wheel 19 formed by the wheel hub 14 and the compressor wheel blades 15. The auxiliary wheel—the rotor part 8—is arranged upstream of the main wheel 19 and is disposed upstream in the compressor inflow duct 16 of the compressor 3 in relation to the main wheel 19. The rotor 8 has a smaller width axially than the main wheel 19 and has essentially the same extent radially as the main wheel. The rotor 8 has a similar basic construction to the main wheel 19 and consists of a wheel hub and radially extending wheel blades. A magnetic cover ring 20 extends around the wheel blades of the rotor 8 and is surrounded by the annular stator 9, which is fixed to the housing. The blading of the rotor 8 is contoured favorably for flow and in particular adapted to the blading of the main wheel 19 according to flow optimized criteria. In this respect, it may be expedient to provide only half as many blades in the rotor 8 as in the main wheel 19.

The magnetic cover ring 20 of the rotor 8 can be formed integrally with the blading of the rotor. According to an alternative advantageous embodiment, it is also possible to design the cover ring 20 as a separate component but to connect it rigidly to the blading of the rotor 8 so as to form a single-piece component.

The exhaust gas turbochargers described above with electric-motor drive and generator operation can be used in both the engine power mode and the engine braking mode of the internal combustion engine.

What is claimed is:

1. An exhaust gas turbocharger for an internal combustion engine, comprising an exhaust gas turbine arranged in an exhaust gas line of the internal combustion engine, and a compressor arranged in an intake section and connected to the exhaust gas turbine via a shaft, and an electric motor for driving a rotattable component of the exhaust gas turbocharger, said electric motor including a rotor integrally formed with the compressor wheel and contoured so as to provide for guidance of the fresh air flow through the compressor.

2. An exhaust gas turbocharger according to claim 1, wherein the rotor extends up to the radial outer edge of the compressor wheel.

3. An exhaust gas turbocharger according to claim 1, wherein said electric motor has a stator which is arranged in the compressor housing annularly around the rotor.

4. An exhaust gas turbocharger according to claim 1 wherein said compressor wheel consists entirely of an electrically conductive material.

5. An exhaust gas turbocharger according to claim 1 wherein said rotor includes compressor wheel blades.

6. An exhaust gas turbocharger according to claim 1 wherein the compressor wheel comprises a main wheel and an auxiliary wheel which is integral with said main wheel and forms said rotor.

7. An exhaust gas turbocharger according to claim 6, wherein the free flow cross section of the auxiliary wheel differs from the free flow cross section of the main wheel.

8. An exhaust gas turbocharger according to claim 7, wherein the free flow cross section of the auxiliary wheel is greater than the free flow cross section of the main wheel.

9. An exhaust gas turbocharger according to claim 6 wherein the number of blades in the auxiliary wheel differs from the number of blades in the main wheel.

10. An exhaust gas turbocharger according to claim 9, wherein the auxiliary wheel has half as many blades as the main wheel.

11. An exhaust gas turbocharger according to claim 6, wherein the main wheel consists of a lighter material than the auxiliary wheel.

12. An exhaust gas turbocharger according to claim 1 wherein the rotor is connected to the shaft in a rotationally fixed manner.

13. An exhaust gas turbocharger according to claim 1 wherein the rotor includes a radially surrounding cover ring.

14. An exhaust gas turbocharger according to claim 1 wherein a recirculation gap for recirculating inflowing fresh air is formed between the radial outer side of the rotor and the radial inner side of the stator.

* * * * *